United States Patent
Krall

(10) Patent No.: US 6,173,644 B1
(45) Date of Patent: Jan. 16, 2001

(54) APPARATUS FOR CONVERTING A GAS GRILL INTO A CHARCOAL BURNING GRILL

(76) Inventor: Michael A. Krall, 17040 Crestview Dr., Victorville, CA (US) 92392

( * ) Notice: Under 35 U.S.C. 154(b), the term of this patent shall be extended for 0 days.

(21) Appl. No.: 09/466,092

(22) Filed: Dec. 17, 1999

(51) Int. Cl.⁷ .............................. A47J 37/00; A47J 37/07
(52) U.S. Cl. .............................. 99/340; 99/446; 99/450; 99/482; 126/25 R; 126/41 R
(58) Field of Search .............................. 99/399, 340, 357, 99/444–450, 481, 482; 126/25 R, 9 R, 9 A, 39 R, 41 R, 25 A, 25 B, 39 E; 426/523; 44/450, 522, 533, 540; D7/359, 360

(56) References Cited

U.S. PATENT DOCUMENTS

| | | |
|---|---|---|
| D. 395,548 | 6/1998 | Morissette . |
| 3,385,282 | 5/1968 | Lloyd . |
| 3,598,102 | 8/1971 | Fuss . |
| 3,824,984 * | 7/1974 | Swanson et al. ................... 126/25 R |
| 4,140,049 * | 2/1979 | Stewart ............................... 126/25 R |
| 4,508,024 * | 4/1985 | Perkins ..................................... 99/340 |
| 4,531,506 | 7/1985 | Chambers et al. . |
| 4,553,524 * | 11/1985 | Wheat et al. ....................... 126/41 R |
| 4,628,897 * | 12/1986 | Stanfa et al. ....................... 126/41 R |
| 4,777,927 * | 10/1988 | Stephen et al. ..................... 126/25 R |
| 4,966,125 * | 10/1990 | Stephen et al. ......................... 99/342 |
| 5,031,602 * | 7/1991 | Vick ....................................... 99/339 |
| 5,065,734 * | 11/1991 | Elliott .................................. 126/9 R |
| 5,070,857 * | 12/1991 | Sarten ................................ 126/25 A |
| 5,197,379 * | 3/1993 | Leonard, Jr. ........................... 99/446 |
| 5,259,299 * | 11/1993 | Ferraro ................................... 99/340 |
| 5,273,555 | 12/1993 | DeCarlo . |
| 5,277,106 * | 1/1994 | Raymer et al. .................... 99/446 X |
| 5,481,965 | 1/1996 | Kronman . |

* cited by examiner

*Primary Examiner*—Timothy F. Simone

(57) ABSTRACT

A apparatus for converting a gas grill into a charcoal burning grill for conveniently using charcoal or other flammable material in a gas grill. The apparatus for converting a gas grill into a charcoal burning grill includes an adapter container for holding flammable material. The adapter container is removably positionable in the interior of the housing. The screen is removable from the housing. The adapter container is positionable on the heating system within the housing of a gas grill. The flammable material is placed in the container and ignited. The screen is replaced such that the screen covers the adapter container.

6 Claims, 2 Drawing Sheets

APPARATUS FOR CONVERTING A GAS GRILL INTO A CHARCOAL BURNING GRILL

BACKGROUND OF THE INVENTION

1. Field of the Invention

The present invention relates to gas grill converters and more particularly pertains to a new apparatus for converting a gas grill into a charcoal burning grill for conveniently using charcoal or other flammable material in a gas grill.

2. Description of the Prior Art

The use of gas grill converters is known in the prior art. More specifically, gas grill converters heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,481,965; U.S. Pat. No. 3,385,282; U.S. Pat. No. 5,273,555; U.S. Pat. No. 3,598,102; U.S. Pat. No. 4,531,506; and U.S. Pat. Des. No. 395,548.

While these devices fulfill their respective, particular objectives and requirements, the aforementioned patents do not disclose a new apparatus for converting a gas grill into a charcoal burning grill. The inventive device includes an adapter container for holding flammable material. The adapter container is removably positionable in the interior of the housing. The screen is removable from the housing. The adapter container is positionable on the heating system within the housing of a gas grill. The flammable material is placed in the container and ignited. The screen is replaced such that the screen covers the adapter container.

In these respects, the apparatus for converting a gas grill into a charcoal burning grill according to the present invention substantially departs from the conventional concepts and designs of the prior art, and in so doing provides an apparatus primarily developed for the purpose of conveniently using charcoal or other flammable material in a gas grill.

SUMMARY OF THE INVENTION

In view of the foregoing disadvantages inherent in the known types of gas grill converters now present in the prior art, the present invention provides a new apparatus for converting a gas grill into a charcoal burning grill construction wherein the same can be utilized for conveniently using charcoal or other flammable material in a gas grill.

The general purpose of the present invention, which will be described subsequently in greater detail, is to provide a new apparatus for converting a gas grill into a charcoal burning grill apparatus and method which has many of the advantages of the gas grill converters mentioned heretofore and many novel features that result in a new apparatus for converting a gas grill into a charcoal burning grill which is not anticipated, rendered obvious, suggested, or even implied by any of the prior art gas grill converters, either alone or in any combination thereof.

To attain this, the present invention generally comprises an adapter container for holding flammable material. The adapter container is removably positionable in the interior of the housing. The screen is removable from the housing. The adapter container is positionable on the heating system within the housing of a gas grill. The flammable material is placed in the container and ignited. The screen is replaced such that the screen covers the adapter container.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new apparatus for converting a gas grill into a charcoal burning grill apparatus and method which has many of the advantages of the gas grill converters mentioned heretofore and many novel features that result in a new apparatus for converting a gas grill into a charcoal burning grill which is not anticipated, rendered obvious, suggested, or even implied by any of the prior art gas grill converters, either alone or in any combination thereof.

It is another object of the present invention to provide a new apparatus for converting a gas grill into a charcoal burning grill which may be easily and efficiently manufactured and marketed.

It is a further object of the present invention to provide a new apparatus for converting a gas grill into a charcoal burning grill which is of a durable and reliable construction.

An even further object of the present invention is to provide a new apparatus for converting a gas grill into a charcoal burning grill which is susceptible of a low cost of manufacture with regard to both materials and labor, and which accordingly is then susceptible of low prices of sale to the consuming public, thereby making such apparatus for converting a gas grill into a charcoal burning grill economically available to the buying public.

Still yet another object of the present invention is to provide a new apparatus for converting a gas grill into a charcoal burning grill which provides in the apparatuses and methods of the prior art some of the advantages thereof, while simultaneously overcoming some of the disadvantages normally associated therewith.

Still another object of the present invention is to provide a new apparatus for converting a gas grill into a charcoal burning grill for conveniently using charcoal or other flammable material in a gas grill.

Yet another object of the present invention is to provide a new apparatus for converting a gas grill into a charcoal burning grill which includes an adapter container for holding flammable material. The adapter container is removably positionable in the interior of the housing. The screen is removable from the housing. The adapter container is positionable on the heating system within the housing of a gas grill. The flammable material is placed in the container and ignited. The screen is replaced such that the screen covers the adapter container.

Still yet another object of the present invention is to provide a new apparatus for converting a gas grill into a charcoal burning grill that is simple to use and converts a gas grill into a charcoal burning grill in a very short amount of time.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
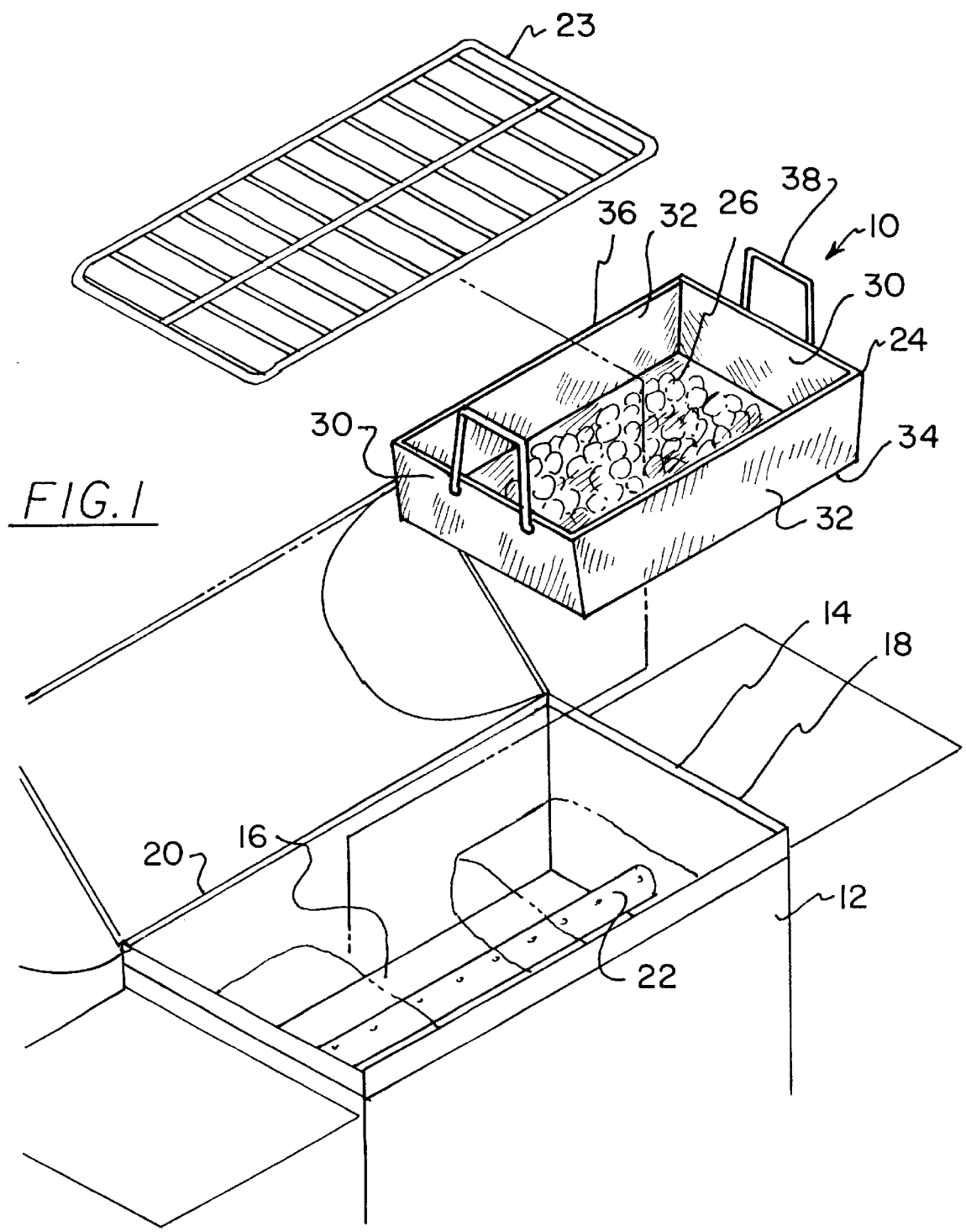
FIG. 1 is a schematic perspective view of a new apparatus for converting a gas grill into a charcoal burning grill according to the present invention.
Figure 2:
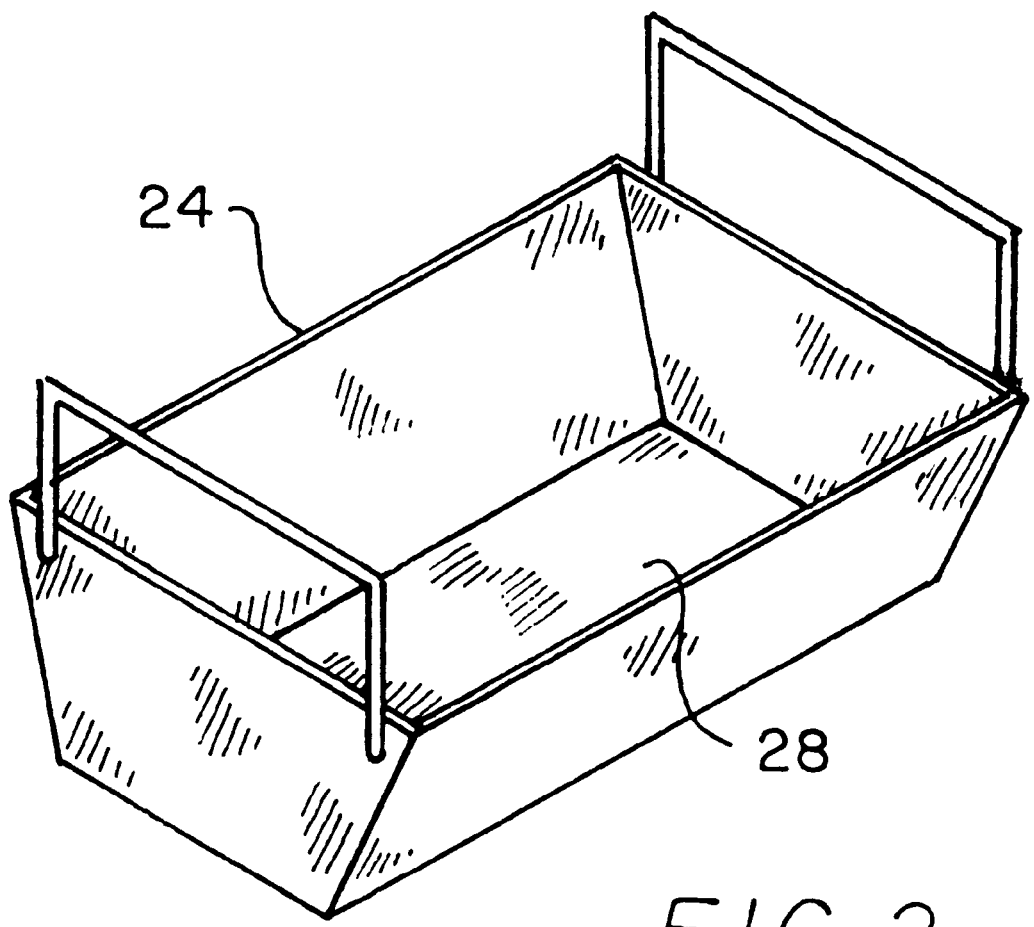
FIG. 2 is a schematic perspective view the second embodiment of the present invention.

With reference now to the drawings, and in particular to FIGS. 1 and 2 thereof, a new apparatus for converting a gas grill into a charcoal burning grill embodying the principles and concepts of the present invention and generally designated by the reference numeral 10 will be described.

As best illustrated in FIGS. 1 and 2, the apparatus for converting a gas grill into a charcoal burning grill 10 generally comprises a gas grill 12 having a housing 14. The housing has an interior defined by a bottom wall 16 and two pairs of opposing side walls 18, 20. The housing has an open top side. The housing has a heating system 22 therein adapted for supplying heat for food preparation from gas combustion.

A screen 23 supports food above the heating system 22. The screen 23 has a shape adapted to rest over the open top side of the housing 14.

An adapter container 24 for holding charcoal 26. The adapter container 24 is removably positionable in the interior of the housing 14. The adapter container 24 has a bottom wall 28, and a pair of opposing side walls 30, 32. Each of the side walls has a generally trapezoidal shape such that length of a bottom peripheral edge 34 of the adapter container is smaller than a length of a top peripheral edge 36 of the adapter container 24. One pair of opposing side walls 30 is a short pair of opposing side walls. Ideally, each of the side walls 30, 32 have a height generally between three inches and four and one-half inches. Preferably, the adapter container 24 has a length generally between twenty-one inches and twenty-one and half inches. Also preferably, the adapter container 24 has a width generally between twelve inches and twelve and one-half inches.

Ideally, each of a pair of handles 38 for lifting the adapter container 24 out of the housing 14 is fixedly attached to one of the short opposing walls 30. The handles 38 are attached to the short opposing walls 30 at a location generally adjacent to the top peripheral edge 36 of the adapter container 24.

FIG. 2 depicts a slightly varied version of the adapter container than is shown is FIG. 1. The adapted container can be made in all sizes in order to fit all gas grills.

In use, the screen 23 is removed from the housing 14. The adapter container 24 is positioned on the heating system 22 within the housing 14. The charcoal 26, or other material, is placed in the adapter container 24 and ignited. The screen 23 is replaced such that the screen 23 covers the adapter container 24. When finished using the adaptive container 24, the adapter container 24 is removed such that the gas grill 12 can be utilized. Other flammable cooking materials such as mesquite and wood chips may be substituted for charcoal.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An apparatus for converting a gas grill into a charcoal burning grill, the gas grill having a housing, the housing having a heating system therein adapted for supplying heat for food preparation from gas combustion, the gas grill having a screen for supporting food above the heating system, said apparatus comprising:

an adapter container for holding flammable material, said adapter container being removably positionable in the interior of said housing; and wherein said screen is removable from said housing, said adapter container being positionable on said heating system within said housing, wherein said flammable material is placed in said container, wherein said flammable material is ignited and said screen is replaced such that said screen covers said adapter container.

2. The charcoal burning grill apparatus as in claim 1, wherein said adapter container comprises:

said adapter container having a bottom wall, and a pair of opposing side walls, each of said side walls having a generally trapezoidal shape such that length of a bottom peripheral edge of said adapter container is smaller than a length of a top peripheral edge of said adapter container, one pair of opposing side walls being a short pair of opposing side walls.

3. The charcoal burning grill apparatus as in claim 2, wherein said adapter container comprises:

each of said side walls having a height generally between three inches and four and one-half inches, said adapter container having a length generally between twenty-one inches and twenty-one and half inches, said adapter container having a width generally between twelve inches and twelve and one-half inches.

4. The charcoal burning grill apparatus as in claim 2, further comprising:

a pair of handles for lifting said adapter container out of said housing, each of said handles being fixedly attached to one of said short opposing walls, said handles each being attached to said short opposing walls at a location generally adjacent to said top peripheral edge of said adapter container.

5. The charcoal burning grill apparatus as in claim 1, wherein said flammable material being selected from the group consisting of charcoal, mesquite and wood chips.

6. A charcoal burning grill system, said system comprising:

a gas grill, said gas grill having a housing, said housing having an interior defined by a bottom wall and two pairs of opposing side walls, said housing having an open top side, said housing having a heating system therein adapted for supplying heat for food preparation from gas combustion;

a screen for supporting food above said heating system, said screen having a shape adapted to rest over said open top side of said housing;

an adapter container for holding charcoal, said adapter container being removably positionable in the interior of said housing, said adapter container having a bottom wall, and a pair of opposing side walls, each of said side walls having a generally trapezoidal shape such that length of a bottom peripheral edge of said adapter container is smaller than a length of a top peripheral edge of said adapter container, one pair of opposing side walls being a short pair of opposing side walls, each of said side walls having a height generally between three inches and four and one-half inches, said adapter container having a length generally between twenty-one inches and twenty-one and half inches, said adapter container having a width generally between twelve inches and twelve and one-half inches;

a pair of handles for lifting said adapter container out of said housing, each of said handles being fixedly attached to one of said short opposing walls, said handles each being attached to said short opposing walls at a location generally adjacent to said top peripheral edge of said adapter container; and wherein said screen is removable from said housing, said adapter container being positionable on said heating system within said housing, wherein charcoal is placed in said adapter container, wherein said charcoal is ignited and said screen is replaced such that said screen covers said adapter container.

\* \* \* \* \*